US012636728B2

(12) United States Patent
Shemkunas et al.

(10) Patent No.: US 12,636,728 B2
(45) Date of Patent: May 26, 2026

(54) FRICTION STIR WELDING TOOL AND WELDING METHOD

(71) Applicant: THE BOEING COMPANY, Arlington, VA (US)

(72) Inventors: Michael Philip Shemkunas, Mukilteo, WA (US); Scott Anthony Rose, Wentzville, MO (US); Mario A. Reyes, Mercer Island, WA (US); Sean Michael Thuston, High Ridge, MO (US); Bryan Tweedy, Piedmont, SD (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/965,039

(22) Filed: Dec. 2, 2024

(65) Prior Publication Data

US 2025/0091155 A1      Mar. 20, 2025

Related U.S. Application Data

(63) Continuation-in-part of application No. 18/063,353, filed on Dec. 8, 2022, now Pat. No. 12,220,761.

(51) Int. Cl.
| | |
|---|---|
| B23K 20/00 | (2006.01) |
| B23K 20/12 | (2006.01) |
| B23K 37/003 | (2025.01) |
| *B33Y 80/00* | (2015.01) |

(52) U.S. Cl.
CPC ........ B23K 20/1255 (2013.01); B23K 37/003 (2013.01); *B33Y 80/00* (2014.12)

(58) Field of Classification Search
CPC .............. B23K 20/126; B23K 20/1245; B23K 20/1255; B23K 20/12; B23K 20/122; B23K 20/123; B23K 20/125; B23K 37/003
See application file for complete search history.

(56) References Cited

U.S. PATENT DOCUMENTS

| | | | | |
|---|---|---|---|---|
| 2,190,125 A * | 2/1940 | Sembdner | ................ | B21H 1/00 |
| | | | | 29/894.012 |
| 4,101,067 A * | 7/1978 | Sloan | .................... | B23K 31/027 |
| | | | | 219/136 |
| 6,213,177 B1 * | 4/2001 | Kempe | .................... | B27B 25/02 |
| | | | | 198/781.01 |
| 6,237,835 B1 * | 5/2001 | Litwinski | ............. | B23K 20/126 |
| | | | | 228/2.1 |
| 7,832,613 B2 * | 11/2010 | Hanlon | .............. | B23K 20/1245 |
| | | | | 228/2.1 |
| 8,875,980 B2 * | 11/2014 | Saito | .................... | B23K 20/122 |
| | | | | 228/2.1 |
| 8,893,951 B2 * | 11/2014 | dos Santos | .......... | B23K 20/122 |
| | | | | 228/2.1 |
| 9,216,472 B2 * | 12/2015 | Sato | .................... | B23K 20/126 |

(Continued)

*Primary Examiner* — Erin B Saad
(74) *Attorney, Agent, or Firm* — Joseph M. Butscher; Carroll, Hoette & Butscher, LLC

(57) ABSTRACT

A friction stir welding (FSW) tool includes a pin configured to extend through a joint line between edges of two work pieces and to rotate to perform a FSW process that welds the two work pieces together at the joint line. A housing is coupled to a distal end of the pin to enable rotation of the pin relative to the housing. The housing includes a main body having one or more cooling channels having one or more arcuate segments. One or more sliders are coupled to the main body of the housing.

20 Claims, 8 Drawing Sheets

(56) References Cited

U.S. PATENT DOCUMENTS

| | | | | |
|---|---|---|---|---|
| 9,457,513 | B2 * | 10/2016 | Hütsch | B23K 20/1255 |
| 9,573,222 | B2 * | 2/2017 | Tavares | B23K 20/126 |
| 9,687,934 | B2 * | 6/2017 | Schindele | B23K 20/1215 |
| 10,286,480 | B2 * | 5/2019 | Schindele | B23K 20/1215 |
| 12,220,761 | B2 * | 2/2025 | Shemkunas | B23K 20/129 |
| 12,337,409 | B2 * | 6/2025 | Liu | B23K 20/26 |
| 12,415,229 | B2 * | 9/2025 | Brendel | B23K 20/1245 |
| 2003/0039716 | A1 * | 2/2003 | Mizukusa | B29C 33/0083 |
| | | | | 249/79 |
| 2007/0267462 | A1 * | 11/2007 | Burton | B23K 20/125 |
| | | | | 228/114.5 |
| 2009/0123778 | A1 * | 5/2009 | Russell | B23K 20/1225 |
| | | | | 228/112.1 |
| 2010/0176182 | A1 * | 7/2010 | Hanlon | B23K 20/126 |
| | | | | 228/2.1 |
| 2012/0248174 | A1 * | 10/2012 | Dos Santos | B23K 20/126 |
| | | | | 228/2.1 |
| 2013/0221069 | A1 * | 8/2013 | Saito | B23K 20/126 |
| | | | | 228/2.1 |
| 2014/0183245 | A1 * | 7/2014 | Yamaguchi | B23K 20/127 |
| | | | | 228/2.1 |
| 2016/0354861 | A1 * | 12/2016 | Xu | B23K 20/227 |
| 2017/0304934 | A1 * | 10/2017 | Carlson | B23K 20/1265 |
| 2019/0255647 | A1 * | 8/2019 | Gandra | B23K 20/1255 |
| 2025/0065437 | A1 * | 2/2025 | Liu | B23K 20/125 |

* cited by examiner

FRICTION STIR WELDING TOOL AND WELDING METHOD

CROSS-REFERENCE TO RELATED APPLICATIONS

This application is a continuation-in-part of U.S. patent application Ser. No. 18/063,353, filed Dec. 8, 2022, now U.S. Pat. No. 12,220,761, which is hereby incorporated by reference in its entirety.

FIELD OF THE DISCLOSURE

Examples of the present disclosure generally relate to friction stir welding tools configured to connect two work pieces together to form a welded joint.

BACKGROUND OF THE DISCLOSURE

Some industrial applications require elongated metal structures. For example, aircraft manufacturers use elongated metal structures for passenger aircraft. These elongated metal structures can be up to or even greater than 40 feet in length. However, it can be difficult to fabricate long, thin metal structures that achieve relatively tight dimensional tolerances and that provide desired strength and stiffness characteristics. One conventional fabrication process involves extruding metal into a desired shape, but the long, thin extrusions tend to experience distortion, such as twisting or bowing. It is exceedingly difficult to extrude thin, elongated hollow structures that provide desired strength and rigidity, and meet the tight dimensional tolerances. Further, some applications may require certain metal compositions for the elongated metal structure that are inherently difficult to extrude. Another conventional fabrication process is fusion welding. However, fusion welding is not a realistic option for some material compositions due to undesirable reactions in the microstructure due to the extreme change in temperature which degrades the material properties. For example, high strength aluminum alloy elongated structures may not be fabricated by fusion welding due to the aluminum alloy forming post-weld cracks. To accommodate these fabrication issues, some elongated metal structures may be thicker and heavier than desired, which adds cost and weight to the aircraft or other application.

SUMMARY OF THE DISCLOSURE

A need exists for a friction stir welding (FSW) tool and method that are able to reliably and repeatably produce a mechanically strong and stiff elongated metal structure that has thin walls. For example, the elongated metal structure may be composed of a high-strength aluminum alloy that is difficult to extrude and fusion weld. The thin walls may reduce material costs and weight, relative to bulkier elongated structures. The reduced weight may be particularly advantageous for aircraft applications.

With those needs in mind, certain examples of the present disclosure provide a friction stir welding (FSW) tool including a pin configured to extend through a joint line between edges of two work pieces and to rotate to perform a FSW process that welds the two work pieces together at the joint line. A housing is coupled to a distal end of the pin to enable rotation of the pin relative to the housing. The housing includes a main body having one or more cooling channels having one or more arcuate segments. One or more sliders are coupled to the main body of the housing.

In at least one example, an upper shoulder surrounds the pin and is configured to be rotated during the FSW process. The upper shoulder is configured to contact respective outer surfaces of the work pieces during the FSW process such that the work pieces are sandwiched between the upper shoulder and the support surface of the housing (such as a stationary lower shoulder enclosed in the housing).

In at least one example, the housing further includes a bearing. The one or more arcuate segments include curved segments extending around one or more portions of the bearing.

In at least one example, the one or more cooling channels include a first cooling channel, and a second cooling channel.

In at least one example, a stationary lower shoulder is secured to the housing. The stationary lower shoulder includes a bore. A portion of the pin extends through the bore. As a further example, the stationary lower shoulder is formed of polycrystalline diamond (PCD). As a further example, the housing further includes an upper plate secured to the main body. The upper plate secures the stationary lower shoulder in position.

The main body of the housing can be additively manufactured.

In at least one example, the one or more sliders include a first slider at a first end of the housing, and a second slider at a second end of the housing. The sliders extend over one or more portions of a top surface of the main body and one or more portions of side walls of the main body. The sliders can be formed of Nylon.

Certain examples of the present disclosure provide a method for a friction stir welding (FSW) tool. The method includes flowing a coolant through the one or more cooling channels; and engaging one or more portions of the two workpieces with the one or more sliders. The method can also include additively manufacturing the main body of the housing.

BRIEF DESCRIPTION OF THE DRAWINGS

These and other features, aspects, and advantages of the present disclosure will become better understood when the following detailed description is read with reference to the accompanying drawings in which like numerals represent like parts throughout the drawings, wherein.

DETAILED DESCRIPTION OF THE DISCLOSURE

Figure 1:
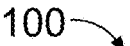
FIG. 1 illustrates a block diagram of a friction stir welding (FSW) machine according to an example of the present disclosure.
Figure 1:
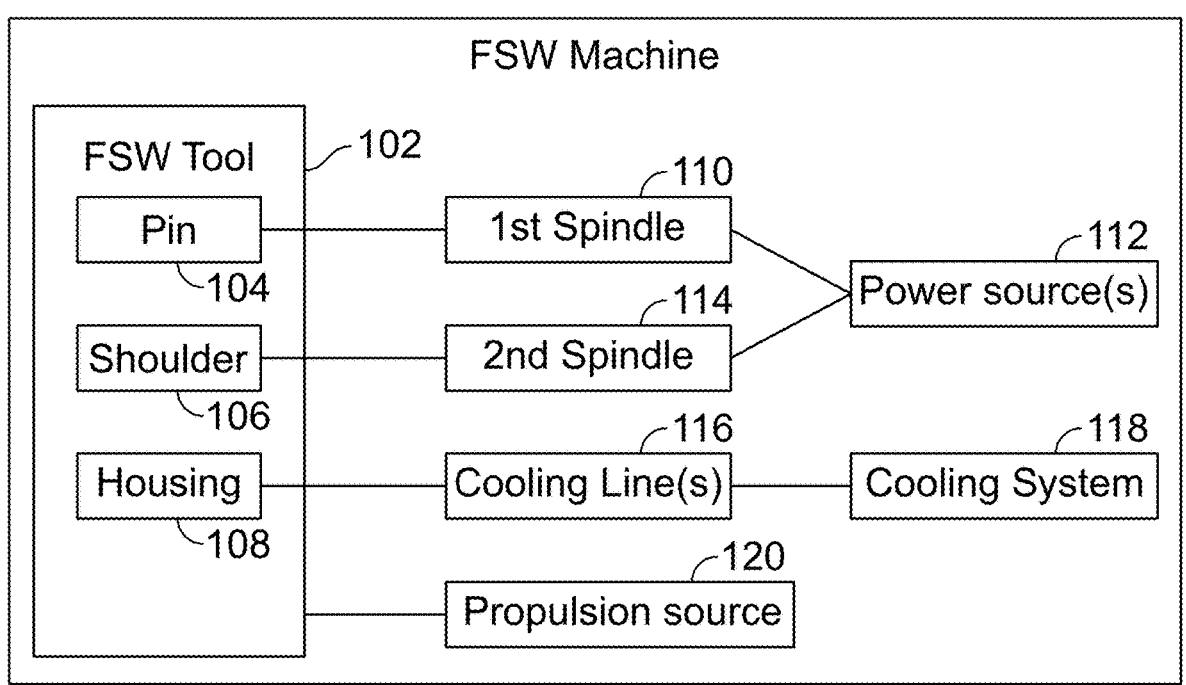

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition can include additional elements not having that condition.

Examples of the present disclosure provide a method and tool for performing friction stir welding (FSW) to secure two elongated work pieces together along a joint. The work pieces may be metal. For example, the work pieces may be metal extrusions.

The FSW tool and method described herein may be used to fabricate weld structures that are both strong and lightweight. The strength may be attributable to the material composition and/or structural design of the weld structure. For example, the FSW tool and method may be used to weld two work pieces composed of a high strength metal alloy. Some high strength metal alloys are not able to be welded by fusion due to the formation of defects, such as cracks. The FSW tool and method may be applicable with at least some of these "unweldable" alloys, such as high-strength aluminum alloys. The structural design of the weld structures may contribute to the strength based on the arrangement of interconnected walls. For example, the work pieces in one or more examples described herein may be arranged to define an elongated, hollow box shape that extends the length of the work pieces. The hollow box may structurally support the shape of the weld structure, increasing the stiffness and strength of the weld structure relative to a structure that lacks an internal hollow box element. One advantage of the strength of the weld structure is that the walls of the weld structure can be relatively thin while still maintaining a designated strength parameter (for example, stiffness, etc.). The walls of the weld structures described herein may be thinner than other known structures in the same or similar applications, which reduces material costs and weight. Providing a reduced weight structure is particularly beneficial for aerial applications, such as commercial aircraft. The structure formed using the FSW tool and method described herein may have better quality (for example, better surface finish, better dimensional accuracy, less deformation, less defects, and/or the like) than other techniques for fabricating elongated structures, such as extruding the structure in its final shape, without welding.

In one example, the weld structure that is formed by friction stir welding two work pieces is a track. For example, the weld structure may be a seat track on a vehicle for securing passenger seats in place within the vehicle. The vehicle may be a road-based vehicle (for example, bus, truck, van, etc.), an aerial vehicle (for example, aircraft, helicopter, spacecraft, etc.), a rail-based vehicle (for example, train), a marine vessel (for example, cruise ship, yacht, etc.), or the like. As an example, multiple passenger seats may be secured to the seat track within a passenger cabin of the vehicle. In a specific example, the FSW device and method described herein may be designed to fabricate a seat track for an aircraft. The examples described herein are not limited to aircraft applications, and are not limited to seat tracks. The FSW device and method may be applied to form various different types of elongated structures for different vehicular and/or non-vehicular applications.

As described herein, examples of the present disclosure provide a FSW tool including one or more cooling channels configured to improve airflow path around a bearing. Further, the FSW includes a stationary lower shoulder, which can have a top hat shape, which is configured to couple to a pin, and prevent or otherwise reduce wear at an interface with a pin, further allowing for a smooth weld surface inside an elongated cavity.

FIG. 1 illustrates a block diagram of a friction stir welding (FSW) machine 100 according to an example of the present disclosure. The FSW machine 100 includes a FSW tool 102, which is a tool that engages work pieces to perform a FSW process and combine the work pieces at a welded joint. The FSW tool 102 includes a pin 104, an upper shoulder 106, and a housing 108. The pin 104 is mechanically connected to an actuator that rotates the pin 104 during the FSW process. In an example, the FSW tool 102 can be a self-reacting type of FSW tool. The FSW tool 102 can include two opposing components that contain the pin 104 in a single assembly and move together along the length of the work pieces to create the weld. For example, the work pieces may be sandwiched between the upper shoulder 106 and a top surface of a stationary lower shoulder 324, enclosed by an upper plate 362 of the housing 108. The pin 104 can extend through the joint during the welding process.

In at least one example, the actuator includes a first spindle 110 that is powered by one or more power sources 112 to rotate the pin 104. The power source(s) 112 can include a motor, a battery, a pneumatic tank that includes compressed gas, a hydraulic pump, and/or the like. For example, the power source(s) 112 can be controlled based on control signals generated by a user input device that controls operation of the FSW machine 100. The spindle 110 and power source(s) 112 can control the rate at which the pin 104 rotates, and may vary the rate based on received control signals.

The housing 108 is coupled to the pin 104. For example, a distal segment of the pin 104 can extend into the housing 108. The pin 104 rotates relative to the housing 108 (and the work pieces) during the FSW process. In an example, the housing 108 does not rotate relative to the work pieces during the FSW process. In at least one example, the upper shoulder 106 is mechanically connected to a second actuator that rotates the upper shoulder 106 during the FSW process. For example, the second actuator can include a second spindle 114 that is powered by the one or more power sources 112 to rotate the upper shoulder 106. Optionally, the rotation of the upper shoulder 106 can be independent of the rotation of the pin 104. In at least one example, the pin 104 can rotate at different times, a different direction, and/or a different rate than the upper shoulder 106. In one setting, the upper shoulder 106 and the pin 104 can be controlled to concurrently rotate at the same rate (for example, speed) and direction. Optionally, the upper shoulder 106 may not be rotated during the FSW process. In that case, the pin 104 rotates relative to the upper shoulder 106, the housing 108, and the work pieces.

Optionally, the housing 108 of the FSW tool 102 can be connected to one or more cooling lines 116, which convey a coolant to and/or from the housing 108 to dissipate heat from the FSW tool 102. The heat may be generated from the frictional forces exerted by the FSW tool 102 on the work pieces and/or frictional forces between moving components within the FSW tool 102 itself. The coolant may be a fluid, such as air. As another example, the coolant can be a glycol solution. As another example, the coolant includes air and a glycol solution. The coolant can be pumped through the cooling line(s) 116 via a cooling system 118. Optionally, the FSW machine 100 can include a first cooling line that delivers the coolant to the housing 108 from the cooling system 118, and a second cooling line that returns the coolant from the housing 108 to the cooling system 118. The cooling line(s) 116 can be hoses, tubes, or the like. Optionally, the FSW machine 100 lacks the cooling system 118 and coolant, and the cooling line(s) 116 are metal rods that passively conduct heat away from the housing 108. Also, optionally, the FSW machine 100 may lack both the cooling system 118 and cooling line(s) 116.

Figure 2:
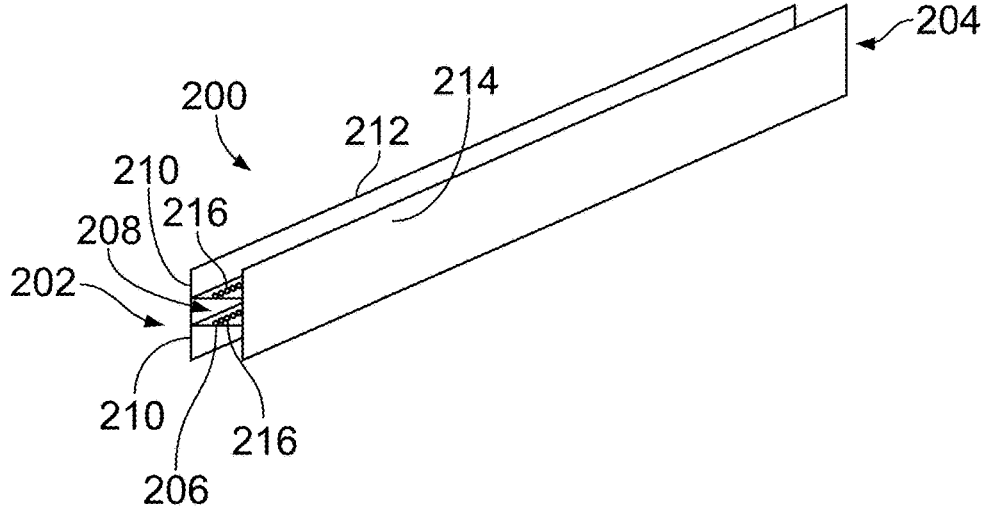
FIG. 2 illustrates an isometric view of a weld structure that is formed by the FSW machine according to an example of the present disclosure.

FIG. 2 illustrates an isometric view of a weld structure 200 that is formed by the FSW machine 100, according to an example of the present disclosure. The weld structure 200 (also referred to herein as structure 200) is elongated and extends from a first end 202 of the structure 200 to a second end 204 of the structure 200, which is opposite the first end 202. The structure 200 may be linear along the length between the first and second ends 202, 204. The structure 200 can include a box-shaped portion 206 that defines an elongated cavity 208. The elongated cavity 208 can extend the entire length of the structure 200. The structure 200 can include one or more wing segments 210 that project from the box-shaped portion 206. The wing segments 210 can extend the length of the structure 200. In at least one example, the structure 200 has four wing segments 210. The structure 200 may not be shown to scale in FIG. 2. For example, the length of the structure 200 may be up to, or greater than, 20 feet, 40 feet, or the like. The walls of the box-shaped portion 206 and/or the wing segments 210 may be relatively thin. In an example, the thickness may be no greater than 0.25 inches, or even no greater than 0.125 inches. The structure 200 may have other cross-sectional shapes in other examples.

In at least one example, the FSW machine 100 (shown in FIG. 1) is used to weld two work pieces together to form the structure 200. For example, a first work piece 212 and a second work piece 214 can be positioned relative to one another such that edges of the work pieces 212, 214 define one or more seams, referred to herein as joint lines 216. The work pieces 212, 214 can be fixed in place via one or more fixtures. The structure 200 has two joint lines 216 in the illustrated example. The joint lines 216 can extend the length of the structure 200. During the FSW process, the FSW tool 102 may travel along the length of the work pieces 212, 214, forming weld joints at the joint lines to integrally connect the two work pieces 212, 214 together and define the unitary weld structure 200 shown in FIG. 2.

Referring again to FIG. 1, in at least one example, the FSW machine 100 can include a propulsion source 120 that moves the FSW tool 102 along the length of the work pieces

212, 214 during the FSW process. The propulsion source 120 can include a powered actuator, a robotic arm, a tool on a suspended track that pulls the FSW tool 102, a traction motor that powers rotation of wheels on the FSW tool 102 to drive along the work pieces 212, 214, and/or the like. The propulsion source 120 can control the movement of the FSW tool 102 during the FSW process at a designated and constant speed. The designated speed can be based on welding conditions to ensure that the FSW tool 102 provides sufficient attention to each section of the joint line to result in a successfully welded joint that is relatively uniform along the length. The welding conditions can include the rotational speed of the pin 104, the material properties of the work pieces 212, 214, the amount of heat dissipation by the coolant, and/or the like. In at least one other example, the FSW tool 102 can be manually pushed or pulled along the length of the joint lines 216 by a human operator during the FSW process.

Figure 3:
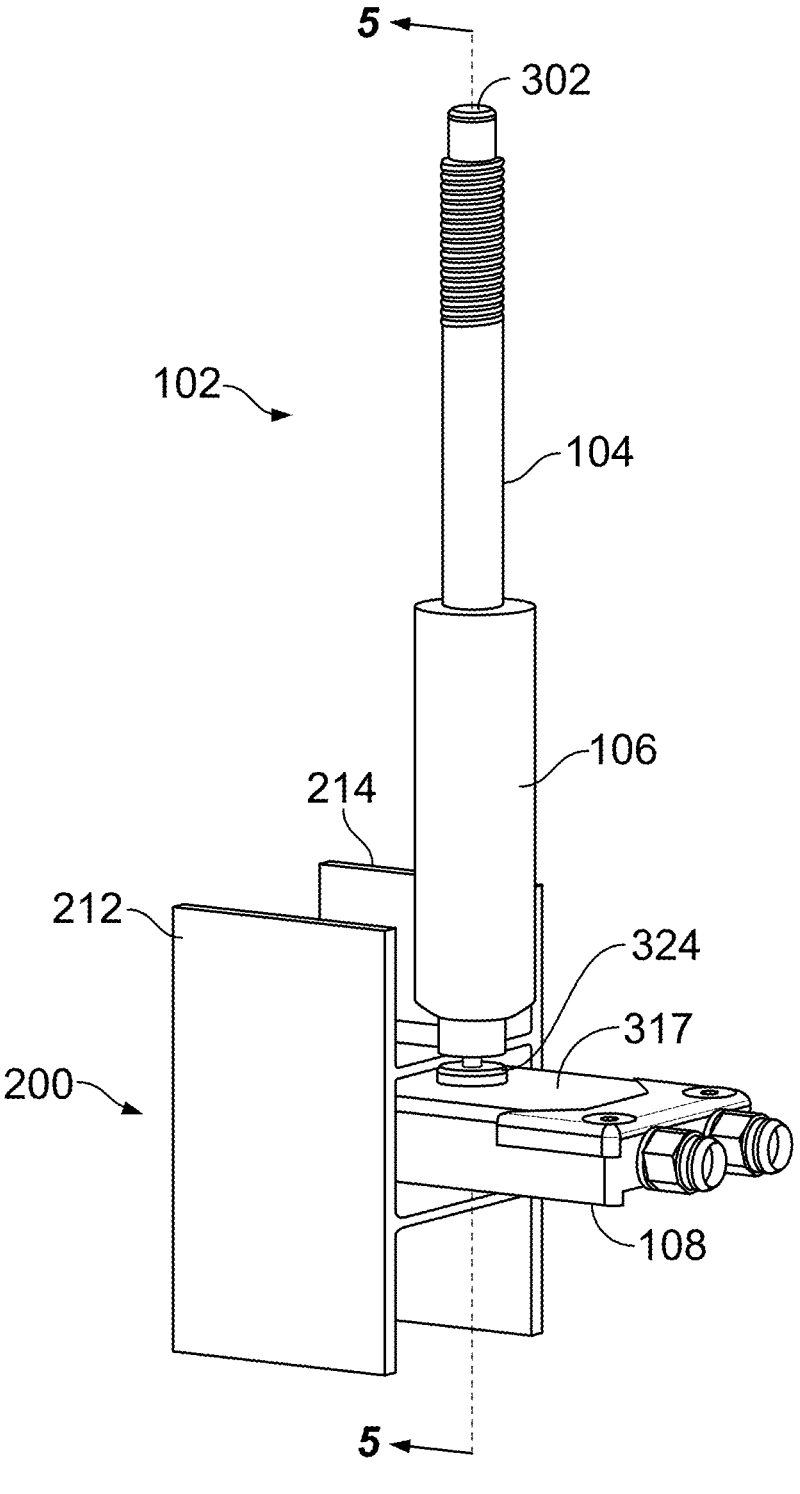
FIG. 3 illustrates an isometric view of the FSW tool and the weld structure, according to an example of the present disclosure
Figures 4, 5:
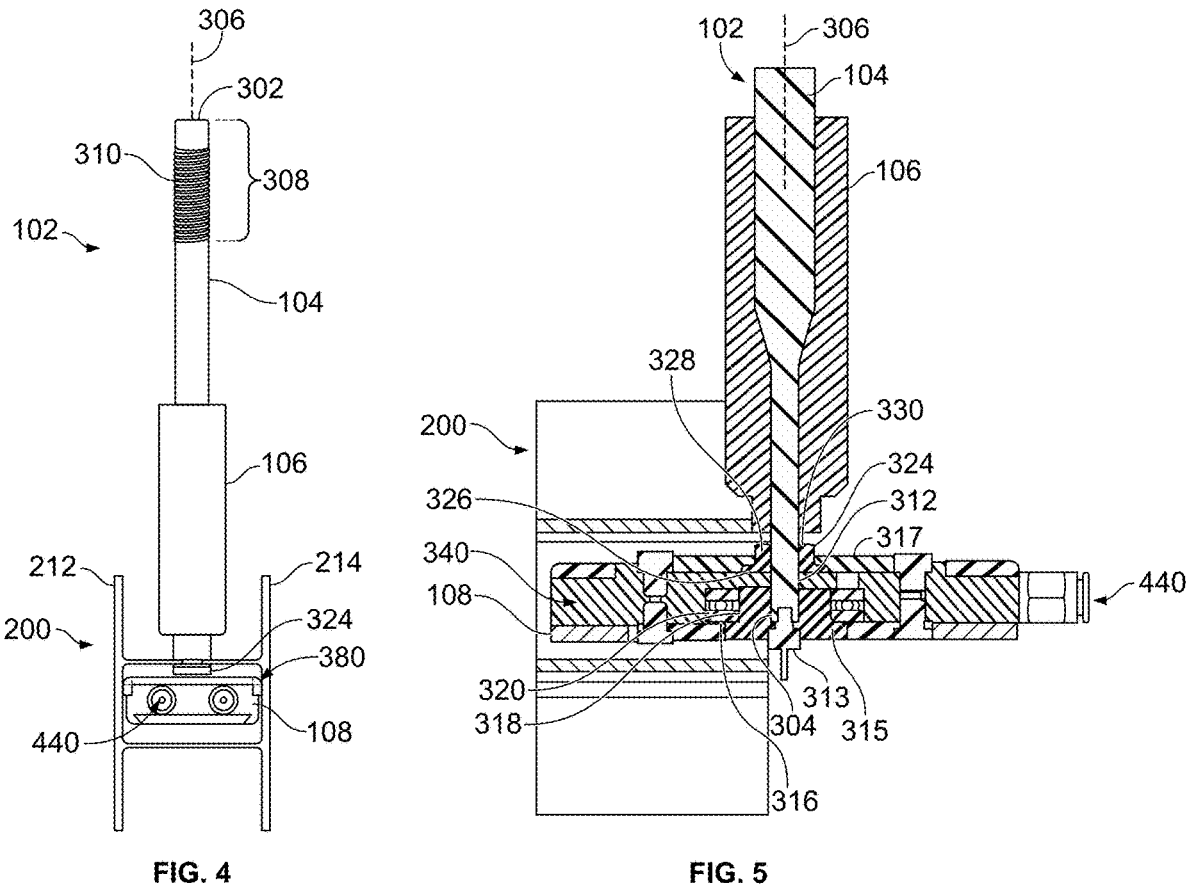
FIG. 4 illustrates an elevation view of the FSW device and the weld structure shown in FIG. 3.
FIG. 5 illustrates a cross-sectional view of the FSW tool and the weld structure shown in FIG. 3.

FIG. 3 illustrates an isometric view of the FSW tool 102 and the weld structure, according to an example of the present disclosure. FIG. 4 illustrates an elevation view of the FSW tool 102 and the weld structure 200 shown in FIG. 3. FIG. 5 illustrates a cross-sectional view of the FSW tool 102 and the weld structure 200 shown in FIG. 3. The cross-section in FIG. 5 is taken along line 5-5 in FIG. 3.

Referring to FIGS. 3-5, the pin 104 is linear and extends from a proximal end 302 of the pin 104 to a distal end 304 of the pin 104 that is opposite the proximal end 302. The pin 104 rotates about a central axis 306 that extends through the pin 104 and is parallel with a length of the pin 104 between the proximal and distal ends 302, 304. A proximal segment 308 of the pin 104 connects to the first spindle 110 (shown in FIG. 1) or another type of actuator assembly that rotates the pin 104. The proximal segment 308 may include helical threads 310. A distal segment 312 of the pin 104 connects to the housing 108. As shown in FIG. 5, the distal segment 312 may extend into the housing 108, and connect to a cap 313, which in turn couples to a rotatable bushing 315. The rotatable bushing 315 connects to a bearing 316 which includes a rotatable inner race 318 and a fixed outer base 320. Rotation of the pin 104 causes rotation of the cap 313, which in turn rotates the inner race 318. The distal end 304 optionally may be within the housing 108 or may project beyond a bottom of the housing 108. The distal segment 312 may include helical threads or another feature for securing the pin 104 to the cap 313. The pin 104 projects from a top surface 317 of the housing 108 such that the proximal segment 308 and the proximal end 302 are outside of the housing 108. In at least one example, a majority of the length of the pin 104 is outside of the housing 108. The pin 104 may be composed of a high-strength metal material.

The stationary lower shoulder 324 is secured to the housing 108. For example, the stationary lower shoulder 324 includes a base 326 having a first diameter that is larger than a second diameter of a tube 328 extending from the base 326. The base 326 extends outwardly from the top surface 317 of the housing 108. The base 26 and the tube 328 provide a top hat shape to the stationary lower shoulder 324. A central bore 330 extends through the stationary lower shoulder 324. A portion of the pin 104 extends through the bore 330. The pin 104 rotates within the bore 330, while the stationary lower shoulder 324 is rotationally constrained. That is, the stationary lower shoulder 324 remains fixed in position relative to the housing 108. In at least one example, in order to reduce friction and heat generated during operation, the stationary lower shoulder 324 is formed of polycrystalline diamond (PCD). It has been found that forming the stationary lower shoulder 324 of PCD substantially reduces wear between the pin 104 and the stationary lower shoulder 324 as the pin 104 rotates during operation. Alternatively, the stationary lower shoulder 324 can be formed of other materials, such as steel or other metals.

As shown, the housing 108 also includes cooling channel 340 extending through a length of the housing 108. The cooling channel 340 extends around the bearing 316. For example, the cooling channel 340 follows and extends along an outer diameter of the bearing 316. Instead of right angled segments, the cooling channel 340 includes arcuate portions that conform to an outer diameter and shape of the bearing 316. In at least one example, the housing 108 can be additively manufactured, such as via a three dimensional (3D) printer. The 3D printer can be operated to additively manufacture the housing 108 including the shape of the cooling channel 340. Alternatively, the housing 108 can be formed from other processes, just as die-casting, molding, or the like.

As shown, the upper shoulder 106 surrounds the pin 104. The upper shoulder 106 can be shorter than the pin 104 such that the upper shoulder 106 surrounds only a section of the pin 104. The upper shoulder 106 can be a hollow shell as shown in FIG. 5. The upper shoulder 106 can be coaxial with the pin 104, and can rotate about the pin 104 (for example, about the central axis 306). The upper shoulder 106 can be cylindrical. The upper shoulder 106 may not be directly connected to the housing 108. For example, during the FSW process, the upper shoulder 106 can be spaced apart from the housing 108 and can contact a different surface of the work pieces 212, 214 than the surface contacted by the housing 108. The upper shoulder 106 can be composed of a metal material. The material composition of the upper shoulder 106 can be the same or different from the composition of the pin 104.

Figure 6:
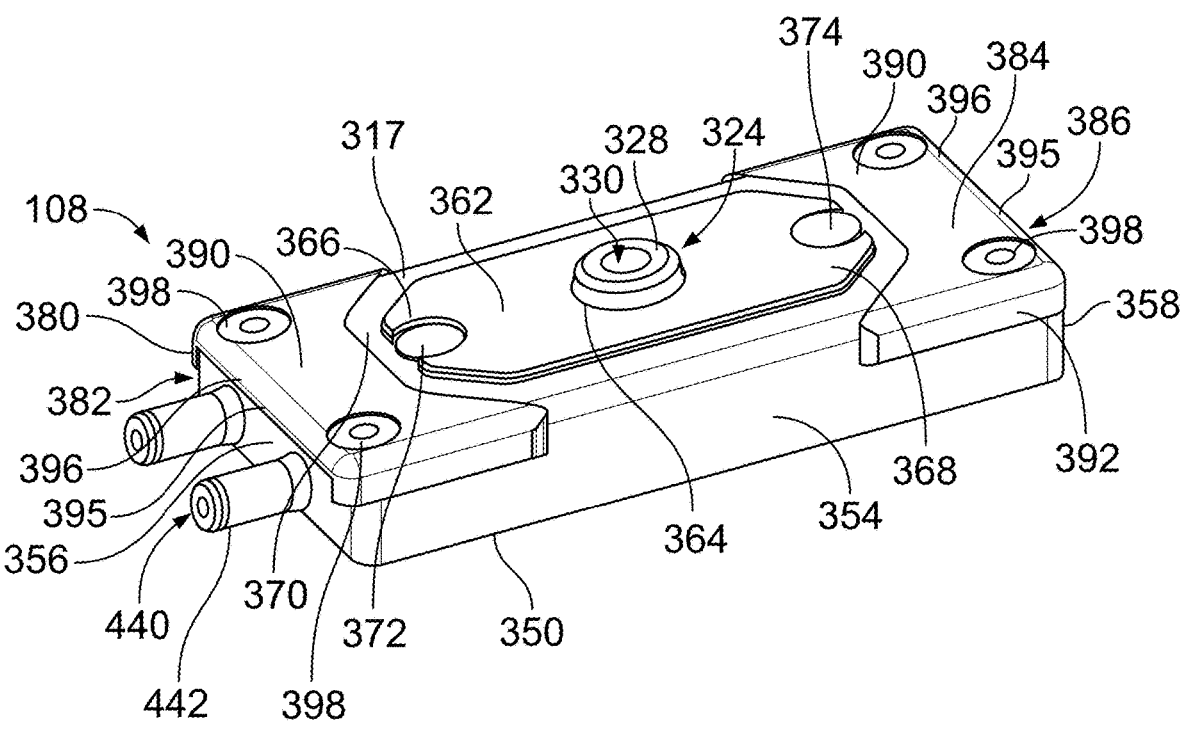
FIG. 6 illustrates an isometric top view of a housing, according to an example of the present disclosure.
Figure 7:
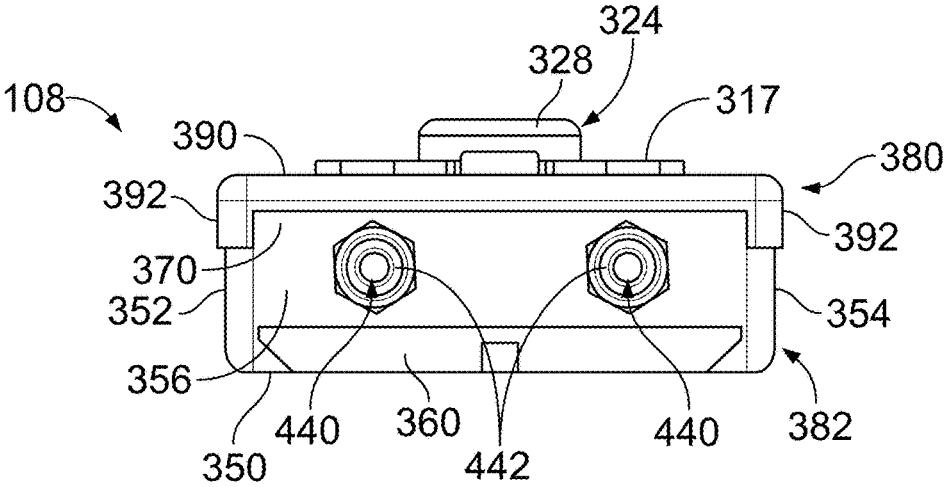
FIG. 7 illustrates an end view of the housing of FIG. 6.

FIG. 6 illustrates an isometric top view of the housing 108, according to an example of the present disclosure. FIG. 7 illustrates an end view of the housing 108 of FIG. 6. Referring to FIGS. 6 and 7, in at least one example, the housing 108 is box-shaped. The housing 108 includes the top surface 317, a bottom surface 350, a first side wall 352, a second side wall 354, a first end wall 356, and a second end wall 358. The housing 108 may be an assembly of multiple components. A lower plate 360 may define at least a portion of the bottom surface 314. An upper plate 362 may define at least a portion of the top surface 317. The upper plate 362 includes a channel 364 through which the tube 328 of the stationary lower shoulder 324 extends. The upper plate 362 secures the stationary lower shoulder 324 in position. The upper plate 362 includes canted ends 366 and 368 that are secured to a main body 370 of the housing 108 through fasteners 372 and 374, such as pins, bolts, or screws.

As shown, a first slider 380 is secured to the housing 108 at a first end 382, and a second slider 384 is secured to the housing at a second end 386, which is opposite form the first end 382. Each of the first slider 380 and the second slider 384 includes a top wall 390 that extends over a portion of a top surface of the main body 370 of housing 108. The top wall 390 connects to lateral bumpers 392 that extend over and past outer top surfaces of the first side wall 352 and the second side wall 354. An outboard end 395 can provide an outboard bumper 396 that projects away from the top surface of the main body 370. The first slider 380 and the second slider 384 can be secured to the main body 370 through one or more fasteners 398, such as pins, bolts, or screws.

Instead of being only on sides of the housing 108, the first slider 380 and the second slider 384 cover portions of the top and sides of the main body 370. By securing the first slider 380 and the second slider 384 to top and side portions of the main body 370, the first slider 380 and the second slider 384 are less susceptible to dislodging during operation.

The first slider 380 and the second slider 384 are formed of a low friction material, such as a plastic (for example, Nylon). The first slider 380 and the second slider 384 are configured to engage surfaces of the weld structure 200 (shown in FIGS. 2-5). Because the first slider 380 and the second slider 384 extend outwardly past outer surfaces of the main body 370, the weld structure 200 is contacted by the low friction surfaces of the first slider 380 and the second slider 384, thereby reducing friction, and providing a smooth, slidable interface between the housing 108 and the weld structure 200 to prevent damage to the weld structure 200.

In at least one example, the housing 108 includes at least one port 440 that extends into the interior of the housing 108. The port 440 can be fluidly connected to the cooling channel(s) 340 (shown in FIG. 5) that extend through the interior of the housing 108. The port 440 may receive a coolant that absorbs heat from the housing 108. As shown, the housing 108 can includes two ports 440 disposed along the first end wall 352. The ports 440 are spaced apart along a width of the housing 108. Optionally, the housing 108 may include a different number of ports and/or at least some of the ports may be disposed on different end walls of the housing 108. In at least one example, a respective fitting 442 is coupled to each port 440. The fitting 442 can be a quick connect fitting. The fitting 442 is configured to connect to a corresponding cooling line 116 (shown in FIG. 1). In at least one example, the fitting 442 is a threaded push connect, configured to connect to supply air from a Y-split that joins a single line from a vortex chiller.

Figure 8:
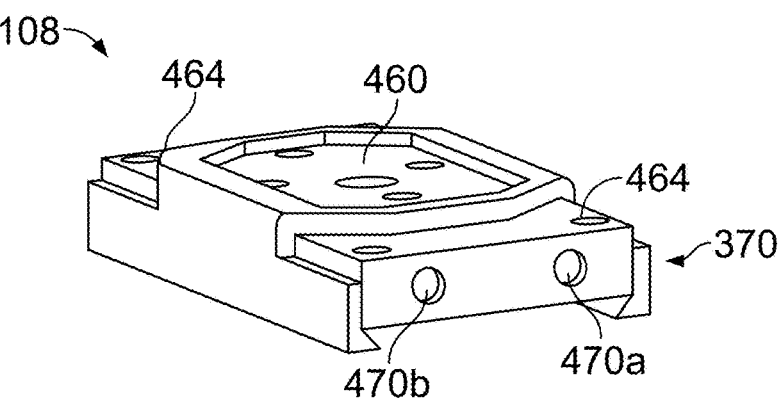
FIG. 8 illustrates an isometric first end view of a main body of the housing, according to an example of the present disclosure.
Figure 9:
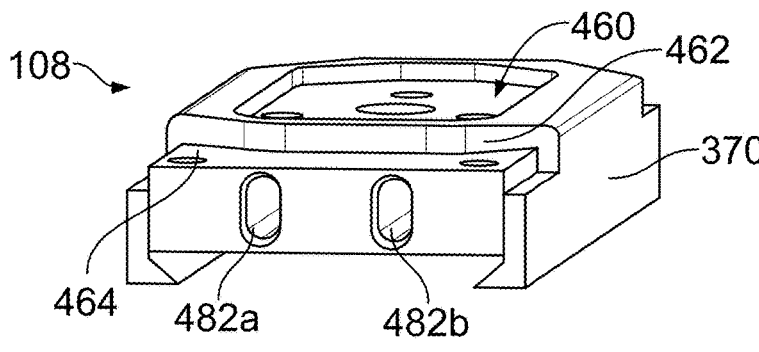
FIG. 9 illustrates an isometric second end view of the main body of the housing of FIG. 8.

FIG. 8 illustrates an isometric first end view of a main body 370 of the housing 108, according to an example of the present disclosure. FIG. 9 illustrates an isometric second end view of the main body 370 of the housing 108 of FIG. 8. Referring to FIGS. 8 and 9, the top surface 317 of the main body includes a central recess 460 configured to receive and retain the upper plate 362 (shown in FIG. 6). A retaining wall 462 extends around a perimeter of the central recess 460. Additionally, end recesses 464 are outboard from end portions of the retaining wall 462. The end recesses 464 are configured to receive and retain the first slider 380 and the second slider 384 (shown in FIGS. 6 and 7). Optionally, the main body 370 may not include the central recess 460 and/or the end recesses 464. Instead, the upper plate 362, the first slider 380, and/or the second slider 384 may sit on flat upper portions of the main body 370.

Figure 10:
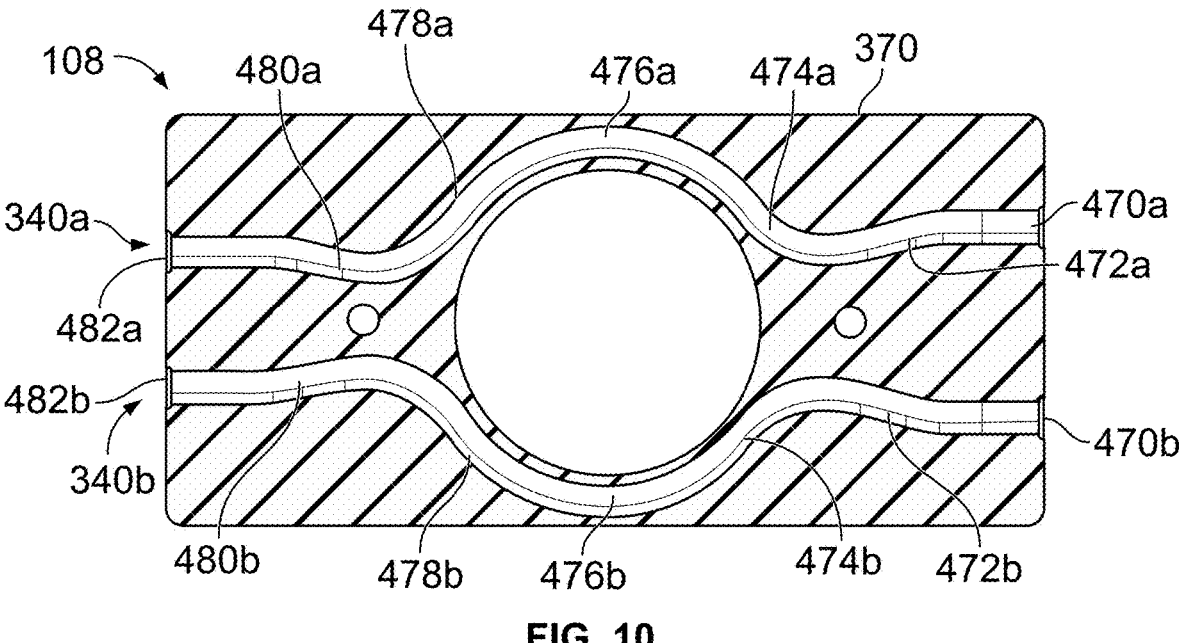
FIG. 10 illustrates a cross-sectional view of the main body of the housing of FIG. 8.
Figure 11:
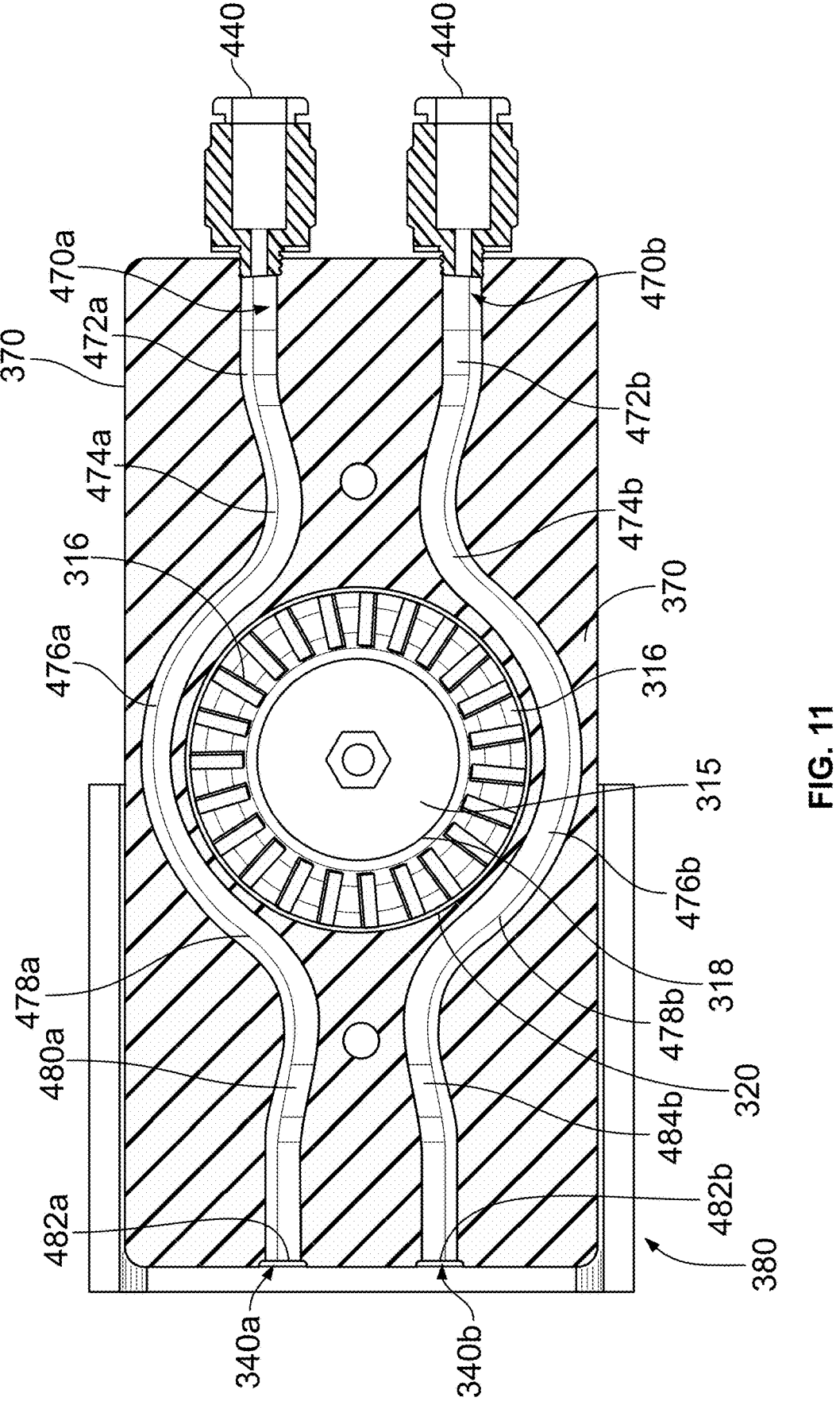
FIG. 11 illustrates a cross-sectional view of the main body of the housing of FIG. 8 retaining a bearing, according to an example of the present disclosure.

FIG. 10 illustrates a cross-sectional view of the main body 370 of the housing 108 of FIG. 8. FIG. 11 illustrates a cross-sectional view of the main body 370 of the housing 108 of FIG. 8 retaining the bearing 316, according to an example of the present disclosure. Referring to FIGS. 10 and 11, a first cooling channel 340a and a second cooling channel 340b are formed through a length of the main body 370 of the housing 108. The first cooling channel 340a includes an inlet 470a that is in fluid communication with a port 440 (shown in FIGS. 6 and 7). The inlet 470a connects to an inwardly curved segment 472a, which, in turn, connects to an outwardly curved segment 474a, which connects to semi-circular outwardly bowed segment 476a, which follows a curvature of the bearing 316 (shown in FIG. 5). The semi-circular outwardly bowed segment 476a, in turn, connects to an outwardly curved segment 478a, which in turn connects to an inwardly curved segment 480a, which, in turn connects to an outlet 482a.

Similarly, the second cooling channel 340b includes an inlet 470b that is in fluid communication with a port 440 (shown in FIGS. 6 and 7). The inlet 470b connects to an inwardly curved segment 472b, which, in turn, connects to an outwardly curved segment 474b, which connects to semi-circular outwardly bowed segment 476a, which follows a curvature of the bearing 316 (shown in FIG. 5). The semi-circular outwardly bowed segment 476b, in turn, connects to an outwardly curved segment 478b, which in turn connects to an inwardly curved segment 480b, which, in turn connects to an outlet 482b.

As shown, the first cooling channel 340a and the second cooling channel 340b include arcuate segments, which follow a contour of one or more outer surfaces of the bearing 316. The housing 108 can include more or fewer cooling channels 340 than shown. For example, the housing 108 can include a single cooling channel 340, or three or more cooling channels.

Figure 12:
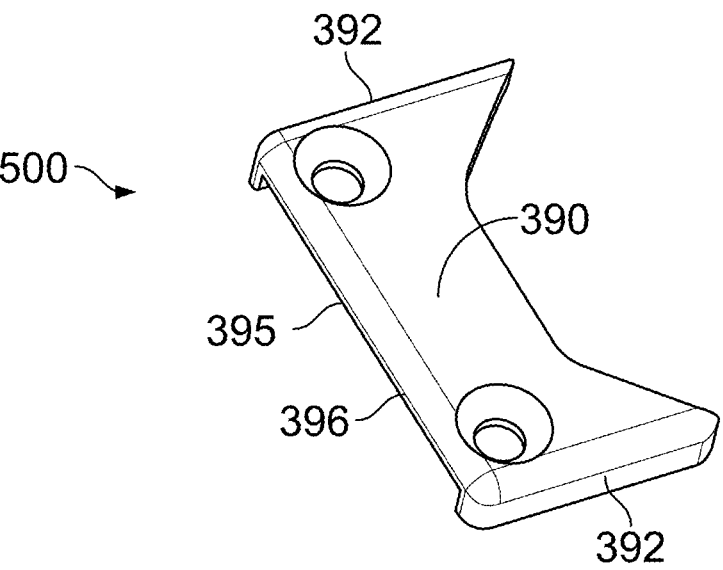
FIG. 12 illustrates an isometric top view of a slider, according to an example of the present disclosure.
Figure 13:
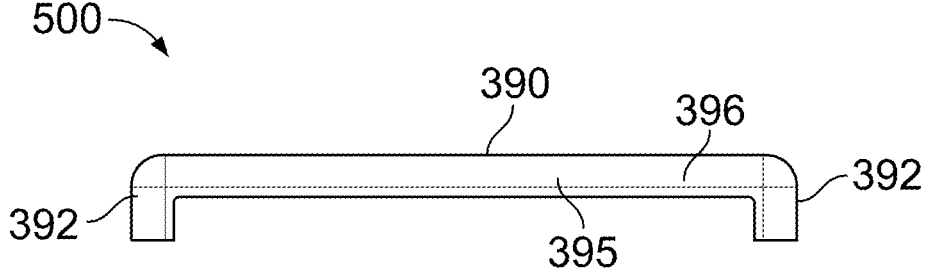
FIG. 13 illustrates an end view of the slider of FIG. 12.
Figure 14:
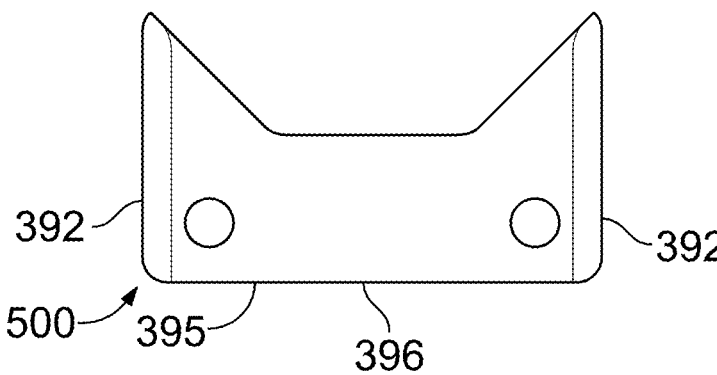
FIG. 14 illustrates a bottom view of the slider of FIG. 12.

FIG. 12 illustrates an isometric top view of a slider 500, according to an example of the present disclosure. FIG. 13 illustrates an end view of the slider 500 of FIG. 12. FIG. 14 illustrates a bottom view of the slider 500 of FIG. 12. Referring to FIGS. 12-14, the slider 500 is an example of the first slider 380 and the second slider 384 (shown in FIGS. 6 and 7). The slider 500 includes a top wall 390, which connects to lateral bumpers 392. An outboard end 395 can provide an outboard bumper 396. The first slider 380 and the second slider 384 are formed of a low friction material, such as a plastic (for example, Nylon).

Referring to FIGS. 1-14, the cooling channel(s) 340 improve airflow path around the bearing 316. The curved paths of the cooling channel(s) 340 conform to an outer shape of the bearing 316. As such, the cooling channel(s) 340 are closer to the bearing 316, and are therefore able to effectively and efficiently draw heat away from the bearing 316. In at least one example, the cooling channels(s) 340 direct airflow onto the middle of the FSW tool 102, and thereby prevent the bearing 316 from overheating. In at least one example, the main body 370 of the housing 108 is formed through additive manufacturing (such as via 3D printing), which allows for efficient formation of the arcuate cooling channel(s) 340. Further, the cooling channel(s) 340 are sized and shaped to prevent interferences with a part being welded.

Figure 15:
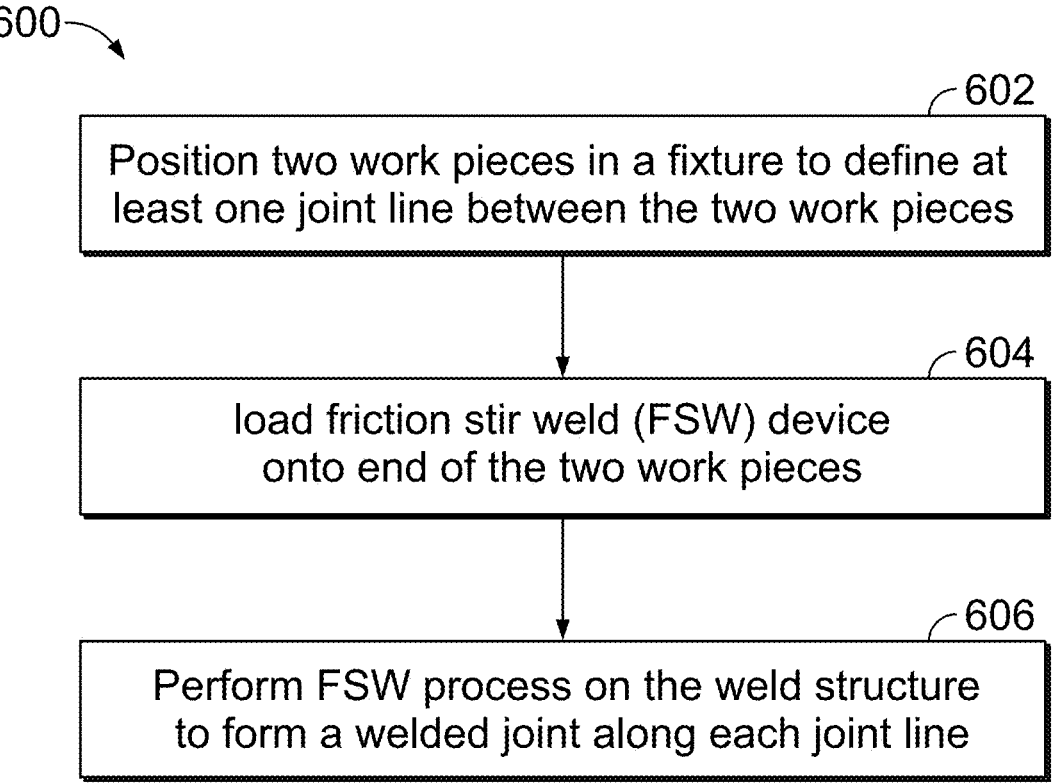
FIG. 15 illustrates a flow chart of a welding method, according to an example of the present disclosure.

FIG. 15 is a flow chart 600 of a welding method, according to an example of the present disclosure. The welding method may be a friction stir welding process. The welding method may be performed using the FSW machine 100 shown in FIG. 1. The method may be performed to weld two extruded, elongated work pieces together to form a unitary, one-piece weld structure. The weld structure may be relatively strong, stiff, and lightweight. The method optionally may include at least one additional step than shown, at least one fewer step than shown, and/or at least one different step than shown in FIG. 15.

Referring to FIGS. 1-15, at step 602, two elongated work pieces 212, 214 are positioned in a fixture to secure the work pieces 212, 214 in fixed positions relative to one another. The work pieces 212, 214 can be oriented in the fixture such that edges of first flanges of the work pieces 212, 214 oppose one another and define a joint line 216. The joint line 216 may extend a length of the elongated work pieces 212, 214.

At step 604, a FSW tool 102 is loaded onto the two elongated work pieces 212, 214 held in the fixture. The FSW tool 102 can be mounted to a combined end segment of the two work pieces 212, 214 at one of the ends. The FSW tool 102 can be loaded onto the work pieces 212, 214 such that a pin 104 of the FSW tool 102 extends through the joint line 216, a housing 108 of the FSW tool 102 is disposed along a first side of the joint line 216, and a upper shoulder 106 of the FSW tool 102 is disposed along a second side of the joint line 216 opposite the first side. Optionally, the end of the of the work pieces 212, 214 may include a pre-formed slot that aligns with the joint line 216 and accommodates the pin 104. The pre-formed slot enables setting up the FSW tool 102 in a designated position prior to rotating the pin 104.

In at least one example, the two elongated work pieces 212, 214 in the fixture define an elongated cavity 208 that extends a length of the work pieces 212, 214. The cavity 208 may be defined by four walls with open ends. The joint line 216 extends through one of the four walls. Optionally, a second joint line 216 extends through another wall of the four walls. Loading the FSW tool 102 onto the two elongated work pieces at step 604 may include positioning the housing 108 within the elongated cavity 208. The housing 108 of the FSW tool 102 may be sized relative to the cavity 208 such that corresponding side surfaces of the work pieces 212, 214 block rotation of the housing 108 within the cavity 208.

At step 606, a FSW process is performed using the FSW tool 102. The FSW process may be performed at least in part by rotating the pin 104 and moving the FSW tool 102 along a length of the joint line 216 to form a welded joint. at the joint line 216. The FSW process may be performed by positioning the housing 108 such that a support surface of the housing 108 contacts respective inner surfaces of the work pieces 212, 214 surrounding the pin 104 and the joint line 216. Performing the FSW process may include sandwiching opposing walls or flanges of the work pieces 212, 214 between a distal end of the upper shoulder 106 and the support surface of the housing 108. The FSW process may also include rotating the upper shoulder 106 relative to the housing 108 such that both the pin 104 and the upper shoulder 106 are rotated. In at least one example, the upper shoulder 106 may be rotated independently of the pin 104. Optionally, the FSW process may include conveying a coolant to an interior of the housing 108 via a coolant line 116 that is connected to a port 440 of the housing 108. The coolant may absorb and dissipate heat from the FSW tool 102.

The work pieces 212, 214 optionally may define both first and second joint lines that extend parallel to one another along the length of the structure 200. For example, the second joint line may be located along an opposite side of the cavity 208 from the first joint line. In an example, performing the FSW process may include forming a first welded joint along the first joint line during a first time period by moving the FSW tool 102 along the length of the structure 200 with the pin 104 extending through the first joint line. Then, the method 600 may include reorienting the FSW tool 102 relative to the work pieces 212, 214 (after forming the first welded joint). The FSW tool 102 may be reoriented such that the pin 104 extends through the second joint line. For example, the FSW tool 102 may be flipped 180 degrees relative to the orientation of the work pieces 212, 214 in the fixture. The FSW process may include making a second pass of the FSW tool 102 along the length of the structure 200 to form a second welded joint at the second joint line.

In another example in which the two work pieces 212, 214 define the two joint lines, the method may include utilizing two different FSW tools 102 to each form one of the two welded joints. For example, a second FSW tool 102 may be loaded onto the work pieces 212, 214 next to the first FSW tool 102. This may include loading the two FSW tools 102 end-to-end within the elongated cavity 208 such that the second FSW tool trails the first FSW tool. The two FSW tools 102 may be copies or replicas of each other, such that the tools have the same components. The FSW machine 100 may be equipped with another set of spindles to simultaneously weld opposite joints.

The two FSW tools may be flipped 180 degrees relative to one another. The pin 104 of the first FSW tool extends through the first joint line, and the pin 104 of the second FSW tool extends through the second joint line. The FSW process may be performed by rotating the pin 104 of the first FSW tool, rotating the pin 104 of the second FSW tool, moving the first FSW tool along the length of the first joint line in a first direction to form the welded joint, and moving the second FSW tool along the length of the second joint line in the first direction to form a second welded joint. The first and second FSW tools may be concurrently moved with the second FSW tool trailing the first FSW tool.

Further, the disclosure includes examples according to the following clauses:

Clause 1: A friction stir welding (FSW) tool comprising:
a pin configured to extend through a joint line between edges of two work pieces and to rotate to perform a FSW process that welds the two work pieces together at the joint line;
a housing coupled to a distal end of the pin to enable rotation of the pin relative to the housing, wherein the housing comprises a main body having one or more cooling channels having one or more arcuate segments; and
one or more sliders coupled to the main body of the housing.

Clause 2. The FSW tool of Clause 1, further comprising an upper shoulder that surrounds the pin and is configured to be rotated during the FSW process, the upper shoulder configured to contact respective outer surfaces of the work pieces during the FSW process such that the work pieces are sandwiched between the upper shoulder and the support surface of stationary lower shoulder enclosed in the housing.

Clause 3. The FSW tool of Clauses 1 or 2, wherein the housing further comprises a bearing, and wherein the one or more arcuate segments comprise curved segments extending around one or more portions of the bearing.

Clause 4. The FSW tool of any of Clauses 1-3, wherein the one or more cooling channels comprise:
a first cooling channel; and
a second cooling channel.

Clause 5. The FSW tool of any of Clauses 1-4, further comprising a stationary lower shoulder secured to the housing, wherein the stationary lower shoulder comprises a bore, and wherein a portion of the pin extends through the bore.

Clause 6. The FSW tool of Clause 5, wherein the stationary lower shoulder is formed of polycrystalline diamond (PCD).

Clause 7. The FSW tool of Clauses 5 or 6, wherein the housing further comprises an upper plate secured to the main body, wherein the upper plate secures the stationary lower shoulder in position.

Clause 8. The FSW tool of any of Clauses 1-7, wherein the main body of the housing is additively manufactured.

Clause 9. The FSW tool of any of Clauses 1-8, wherein the one or more sliders comprise:
a first slider at a first end of the housing; and
a second slider at a second end of the housing.

Clause 10. The FSW of any of Clauses 1-9, wherein the one or more sliders extend over one or more portions of a top surface of the main body and one or more portions of side walls of the main body.

Clause 11. The FSW of any of Clauses 1-10, wherein the one or more sliders are formed of Nylon.

Clause 12. A method for a friction stir welding (FSW) tool, the FSW tool comprising:
a pin configured to extend through a joint line between edges of two work pieces and to rotate to perform a FSW process that welds the two work pieces together at the joint line;
a housing coupled to a distal end of the pin to enable rotation of the pin relative to the housing, wherein the housing comprises a main body having one or more cooling channels having one or more arcuate segments; and
one or more sliders coupled to the main body of the housing,
the method comprising:
flowing a coolant through the one or more cooling channels; and
engaging one or more portions of the two workpieces with the one or more sliders.

Clause 13. The method of Clause 12, wherein the housing further comprises a bearing, and wherein the one or more arcuate segments comprise curved segments extending around one or more portions of the bearing.

Clause 14. The method of Clauses 12 or 13, further comprising extending a portion of the pin through a bore of a stationary lower shoulder secured to the housing, wherein the stationary lower shoulder is formed of polycrystalline diamond (PCD).

Clause 15. The method of any of Clauses 12-14, further comprising additively manufacturing the main body of the housing.

Clause 16. The method of any of Clauses 12-15, wherein the one or more sliders extend over one or more portions of a top surface of the main body and one or more portions of side walls of the main body, and wherein the one or more sliders are formed of Nylon.

Clause 17. A friction stir welding (FSW) tool comprising:
a pin configured to extend through a joint line between edges of two work pieces and to rotate to perform a FSW process that welds the two work pieces together at the joint line;
a housing coupled to a distal end of the pin to enable rotation of the pin relative to the housing, wherein the housing comprises a main body having a first cooling channel and a second cooling channel, wherein the first cooling channel and the second cooling channel include curved segments extending around one or more portions of a bearing;
a first slider at a first end of the housing, wherein the first slider extends over one or more first top portions of a top surface of the main body and one or more first side portions of side walls of the main body;
a second slider at a second end of the housing, wherein the second slider extends over one or more second top portions of the top surface of the main body and one or more second side portions of the side walls of the main body;

a stationary lower shoulder secured to the housing, wherein the stationary lower shoulder comprises a bore, and wherein a portion of the pin extends through the bore; and a upper shoulder that surrounds the pin and is configured to be rotated during the FSW process, the upper shoulder configured to contact respective outer surfaces of the work pieces during the FSW process such that the work pieces are sandwiched between the upper shoulder and the support surface of the stationary lower shoulder enclosed in the housing.

Clause 18. The FSW tool of Clause 17, wherein the stationary lower shoulder is formed of polycrystalline diamond (PCD).

Clause 19. The FSW tool of Clause 18, wherein the housing further comprises an upper plate secured to the main body, wherein the upper plate secures the stationary lower shoulder in position.

Clause 20. The FSW tool of any of Clauses 17-19, wherein the first slider and the second slider are formed of Nylon.

As described herein, examples of the present disclosure provide a FSW tool and method that are able to reliably and repeatably produce a mechanically strong and stiff elongated metal structure that has thin walls.

While various spatial and direction terms such as top, bottom, lower, mid, lateral, horizontal, vertical, front and the like can be used to describe embodiments of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A friction stir welding (FSW) tool comprising:
a pin configured to extend through a joint line between edges of two work pieces and to rotate to perform a FSW process that welds the two work pieces together at the joint line;
a housing coupled to a distal end of the pin to enable rotation of the pin relative to the housing, wherein the housing comprises a main body having one or more cooling channels having one or more arcuate segments; and
one or more sliders coupled to the main body of the housing.

2. The FSW tool of claim 1, further comprising an upper shoulder that surrounds the pin and is configured to be rotated during the FSW process, the upper shoulder configured to contact respective outer surfaces of the work pieces during the FSW process such that the work pieces are sandwiched between the upper shoulder and a support surface of a lower shoulder enclosed in the housing.

3. The FSW tool of claim 1, wherein the housing further comprises a bearing, and wherein the one or more arcuate segments comprises curved segments extending around one or more portions of the bearing.

4. The FSW tool of claim 1, wherein the one or more cooling channels comprise:
a first cooling channel; and
a second cooling channel.

5. The FSW tool of claim 1, further comprising a lower shoulder secured to the housing, wherein the lower shoulder comprises a bore, and wherein a portion of the pin extends through the bore.

6. The FSW tool of claim 5, wherein the lower shoulder is formed of polycrystalline diamond (PCD).

7. The FSW tool of claim 5, wherein the housing further comprises an upper plate secured to the main body, wherein the upper plate secures the lower shoulder in position.

8. The FSW tool of claim 1, wherein the main body of the housing is additively manufactured.

9. The FSW tool of claim 1, wherein the one or more sliders comprise:
a first slider at a first end of the housing; and
a second slider at a second end of the housing.

10. The FSW of claim 1, wherein the one or more sliders extend over one or more portions of a top surface of the main body and one or more portions of side walls of the main body.

11. The FSW of claim 1, wherein the one or more sliders are formed of nylon.

12. A method for a friction stir welding (FSW) tool, the FSW tool comprising:

a pin configured to extend through a joint line between edges of two work pieces and to rotate to perform a FSW process that welds the two work pieces together at the joint line;

a housing coupled to a distal end of the pin to enable rotation of the pin relative to the housing, wherein the housing comprises a main body having one or more cooling channels having one or more arcuate segments; and one or more sliders coupled to the main body of the housing, the method comprising:

flowing a coolant through the one or more cooling channels; and engaging one or more portions of the two workpieces with the one or more sliders.

13. The method of claim 12, wherein the housing further comprises a bearing, and wherein the one or more arcuate segments comprise curved segments extending around one or more portions of the bearing.

14. The method of claim 12, further comprising extending a portion of the pin through a bore of a lower shoulder secured to the housing, wherein the stationary lower shoulder is formed of polycrystalline diamond (PCD).

15. The method of claim 12, further comprising additively manufacturing the main body of the housing.

16. The method of claim 12, wherein the one or more sliders extend over one or more portions of a top surface of the main body and one or more portions of side walls of the main body, and wherein the one or more sliders are formed of nylon.

17. A friction stir welding (FSW) tool comprising:

a pin configured to extend through a joint line between edges of two work pieces and to rotate to perform a FSW process that welds the two work pieces together at the joint line;

a housing coupled to a distal end of the pin to enable rotation of the pin relative to the housing, wherein the housing comprises a main body having a first cooling channel and a second cooling channel, wherein the first cooling channel and the second cooling channel include curved segments extending around one or more portions of a bearing;

a first slider at a first end of the housing, wherein the first slider extends over one or more first top portions of a top surface of the main body and one or more first side portions of side walls of the main body;

a second slider at a second end of the housing, wherein the second slider extends over one or more second top portions of the top surface of the main body and one or more second side portions of the side walls of the main body;

a lower shoulder secured to the housing, wherein the lower shoulder comprises a bore, and wherein a portion of the pin extends through the bore; and an upper shoulder that surrounds the pin and is configured to be rotated during the FSW process, the upper shoulder configured to contact respective outer surfaces of the work pieces during the FSW process such that the work pieces are sandwiched between the upper shoulder and a support surface of the lower shoulder enclosed in the housing.

18. The FSW tool of claim 17, wherein the lower shoulder is formed of polycrystalline diamond (PCD).

19. The FSW tool of claim 18, wherein the housing further comprises an upper plate secured to the main body, wherein the upper plate secures the lower shoulder in position.

20. The FSW tool of claim 17, wherein the first slider and the second slider are formed of nylon.

* * * * *